US006467247B1

(12) United States Patent
Harrison et al.

(10) Patent No.: US 6,467,247 B1
(45) Date of Patent: Oct. 22, 2002

(54) ROTOR BLADE DOOR AND METHOD

(75) Inventors: Thomas M. Harrison, 21 Thomas Cook Rd., Laurel, MS (US) 39440; Glenn Harrison, 22 Thomas Cook Rd., Laurel, MS (US) 39440

(73) Assignees: Thomas M. Harrison, Laurel, MS (US); Glenn Harrison, Laurel, MS (US)

( * ) Notice: Subject to any disclaimer, the term of this patent is extended or adjusted under 35 U.S.C. 154(b) by 0 days.

(21) Appl. No.: 09/597,645

(22) Filed: Jun. 20, 2000

(51) Int. Cl.[7] ............................................... A01D 67/00
(52) U.S. Cl. ..................................................... 56/320.1
(58) Field of Search ................................. 56/14.7, 16.7, 56/17.5, 320.1, 320.2

(56) References Cited

U.S. PATENT DOCUMENTS

| | | | | |
|---|---|---|---|---|
| 3,657,866 A | * | 4/1972 | Burroughs | 56/15.3 |
| 4,147,018 A | * | 4/1979 | Valdespino | 30/276 |
| 4,378,668 A | * | 4/1983 | Gullett | 56/12.7 |
| 4,445,312 A | * | 5/1984 | Cartner | 56/15.5 |
| 4,466,235 A | * | 8/1984 | Cole | 56/17.5 |
| 5,237,803 A | * | 8/1993 | Domingue, Jr. | 56/14.7 |
| 5,657,620 A | * | 8/1997 | Thagard et al. | 56/320.1 |
| 5,765,348 A | * | 6/1998 | Thagard et al. | 56/320.1 |
| 6,178,729 B1 | * | 1/2001 | Vastag | 56/17.5 |

* cited by examiner

Primary Examiner—Thomas B. Will
Assistant Examiner—Nathan Mammen
(74) Attorney, Agent, or Firm—Welsh & Katz, Ltd.; Thomas W. Tolpin

(57) ABSTRACT

A convenient user-friendly method to sharpen the rotary blade of a rotary cutter assembly without having to turn the rotary cutter assembly upside down. To this end, a rotary cutter assembly is provided with a special access door which is preferably securely fastened and/or locked during cutting and use of the rotary cutter assembly. When it is desired to sharpen the rotary blade, the door is unfastened and opened to permit access to the rotary blade. The rotary blade can then be clamped or otherwise secured and subsequently sharpened with a grinding wheel or other sharpening tool.

8 Claims, 3 Drawing Sheets

ROTOR BLADE DOOR AND METHOD

BACKGROUND OF THE INVENTION

This invention pertains to agricultural equipment and, more particularly, to a rotary cutter and method of sharpening a rotary cutter blade.

Rotary cutters, sometimes referred to as bush hogs, are powered and pulled by tractors and are very useful for mowing and cutting grass, weeds, fields of clover, and severing and chopping shrubs, bushes, and other plants, as well as twigs, branches, and plant debris on farmland. Rotary cutters are hitched to a tractor. Rotary cutters can also have a wheel so that the rotary cutter can be more smoothly pulled by the tractor.

Rotary cutter blades are quite large and typically span 4–10 feet. Rotary cutter blades rotate and spin in a manner somewhat similar to a propeller, except in a horizontal direction generally parallel to the ground (soil). Conventional rotary cutters have solid housings about the tops and sides of the rotary cutter blades and have open bottoms so that the rotary cutter blades can contact and cut grass, weeds, shrubs, bushes, etc. on the farmland.

The edges of rotary cutter blades are required to be sharp in the direction of rotation to cut grass, weeds, shrubs, bushes, etc. Conventional rotary cutters only permit manual access and contact of rotary cutter blades from the bottom of the rotary cutter. Conventional rotary cutters are also very heavy, bulky and awkward.

Sharpening, maintaining or replacing rotary cutter blades in conventional rotary cutters are very cumbersome, tedious and labor intensive. After conventional rotary cutters are stopped, unhitched and disconnected from tractors, 2–5 strong farmers are typically required to turn each rotary cutter upside down. The rotary cutter assemblies can be disassembled with various tools so that the rotary cutter blades can be removed and placed in vices for sharpening by grinders.

After conventional rotary cutter blades have been sharpened, the rotary cutter assemblies are re-assembled, tightened, and re-connected to the housings so that each rotary cutter can be lifted and turned right side up by 2–5 strong farmers. Such manpower is not always available when it is necessary to sharpen, maintain, or replace the rotary cutter blades. The rotary cutters are then hitched and reconnected to the tractors. The preceding method is not only awkward, clumsy, and tedious, but it can be dangerous, harmful and injure farmers, such as if the heavy housings crush the farmer's foot, or the blades cut the farmer's hands or feet.

It is important to keep the rotary cutter blades sharp to be able to efficiently cut grass, weeds, shrubs, bushes, etc. Dull blades can be totally ineffective in cutting grass, weeds, shrubs, bushes, etc. When rotary cutter blades start becoming dull, the tractor must often be driven over the same patch of land numerous times to cut all the grass, weeds, shrubs, bushes, etc., in the path of the tractor. This requires more fuel for tractors and is wasteful, time-consuming and costly to farmers.

It is, therefore, desirable to provide an improved rotary cutter and method of sharpening rotary cutter blades which overcome most, if not all, of the preceding problems.

SUMMARY OF THE INVENTION

An improved rotary cutter assembly and method is provided to easily sharpen the rotary blade of the rotary cutter assembly without having to turn the rotary cutter assembly upside down. Advantageously, the special rotary cutter assembly and method is convenient, easy-to-use, and effective. Desirably, user-friendly the rotary cutter assembly enhances operator safety, fuel economy, and efficient cutting. The economical rotary cutter assembly and method also uses less manpower, decreases labor costs, lowers downtime, reduces turnaround time, and improves maintenance and operation of the rotary cutter assembly.

The rotary cutter assembly can be used with a tractor or machine in areas where one or more rotary blades are useful to cut grass, weeds, fields of clover, shrubs, bushes, and other plants. The rotary blade can be rotated by a rotary-blade shaft (output shaft) via a coupling of a drive shaft or hydraulic pump or motor of the tractor or machine. Preferably, the rotary cutter assembly has a housing providing a frame to cover the rotary blade in order to protect the operator from cuttings and flying debris during operation of the rotary blade, as well as to protect the rotary blade from rain and the environment. A wheel assembly can be operatively connected to the frame to help elevate the cutter blade above the ground as well as to facilitate wheeled transport (pulling or pushing) by the tractor or machine.

In order to facilitate sharpening of the rotary blade, the frame has an opening to permit access to the rotary blade. The opening could be in the side (peripheral skirt) of the frame to permit sidewise (lateral) access to the rotary blade, but is preferably in the top (cover) to permit downward access from above to the rotary blade. The opening is closed by a special door, which is locked, bolted, or otherwise fastened and secured to the frame during operation of the rotary and cutter assembly in order to block the access opening and prevent cuttings and flying debris from striking the operator during rotation of the rotary blade.

When it is desired to sharpen the blade, the rotary blade can be stopped, the rotary-blade shaft (output shaft) can be disconnected (decoupled) from the drive shaft, the frame can be unhitched (disconnected) from the tractor or machine, and the door (hatch) can be unfastened (unlocked). The door can then opened, such as with a doorknob or other handle, to permit access through the opening to the rotary blade. The rotary blade can be secured, such as with a clamp and safety cable or strap, to help prevent rotation and other movement of the rotary blade during sharpening. A grinder (grinding wheel), file, or other sharpening tool (instrument) can then be used to sharpen the rotary blade. The preceding procedure can be reversed after the rotary cutter blade has been sharpened in order to use the sharpened rotary blades of the rotary cutter assembly to cut grass, weeds, shrubs, bushes, plants, etc.

A more detailed explanation of the invention is provided in the following description and appended claims, taken in conjunction with the accompanying drawings

DETAILED DESCRIPTION OF THE PREFERRED EMBODIMENTS

Figure 1:
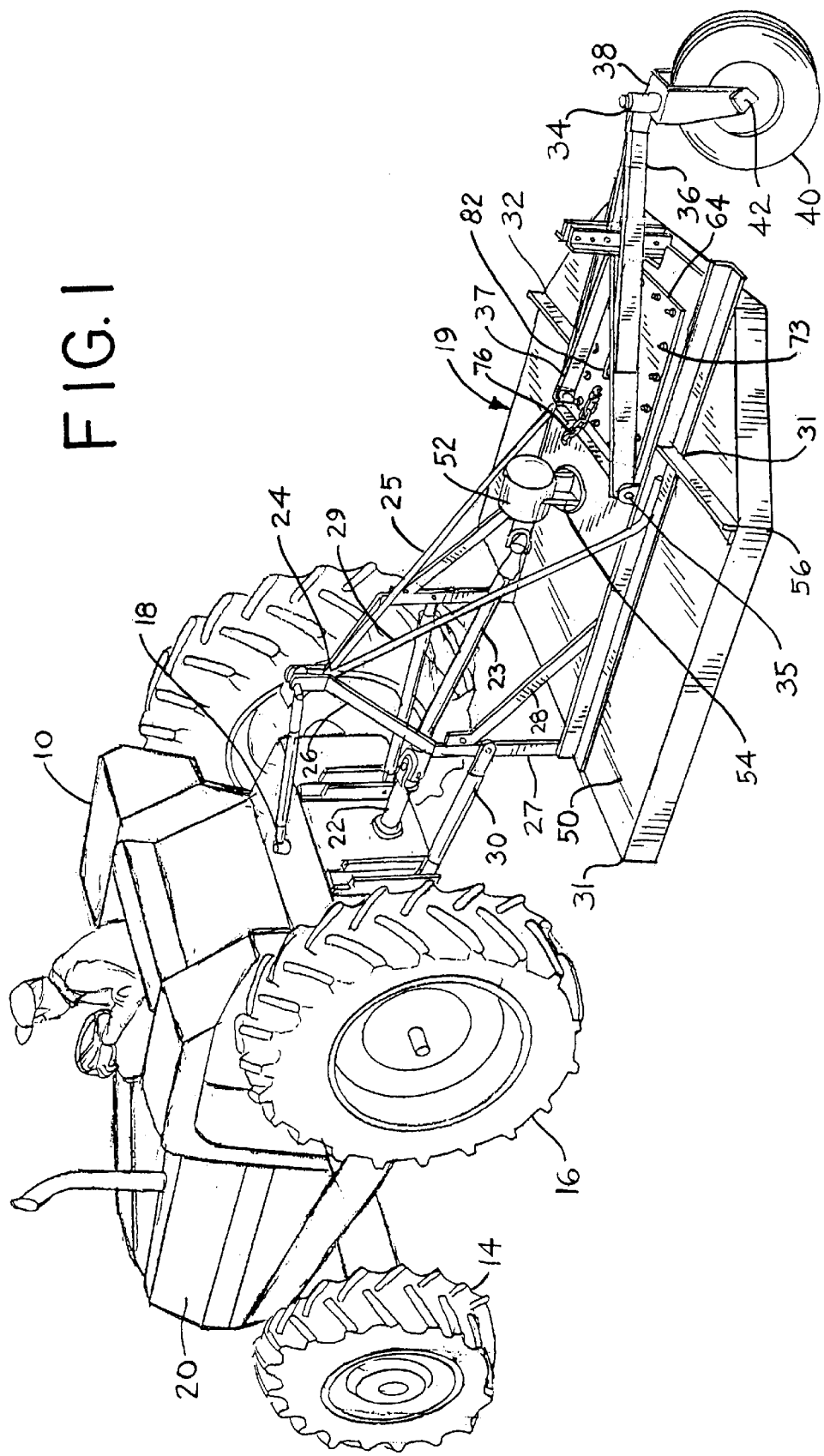
FIG. 1 is a perspective view of a rotary cutter assembly being pulled by a tractor in accordance with principles of the present invention.

A tractor 10 (FIG. 1) or other machine can be used to pull a rotary cutter assembly 12, sometimes referred to as a "rotary cutter" or "bush hog". The tractor can have front wheels 14 and larger back (rear) wheels 16. The tractor can also have a tractor-hitch 18 to connect (couple) the tractor to the rotary cutter assembly 19 or other farm equipment. The tractor can be powered by a diesel engine or an internal combustion engine 20 and motor which drives and rotates a drive train 22 with a drive shaft 23.

The rotary cutter assembly can be made of metal. The rotary cutter assembly can have a hitch assembly 24 (FIG. 1) which provides a rotary cutter-hitch. The hitch assembly can be coupled to the tractor-hitch to connect the rotary cutter assembly to the tractor. The rotary cutter-hitch assembly can comprise bars 25–31 which can include support bars and cross bars. The hitch assembly is welded, bolted or otherwise secured to a rotary cutter-housing 31 (housing) comprising a rotary-cutter frame 32.

Figure 3:
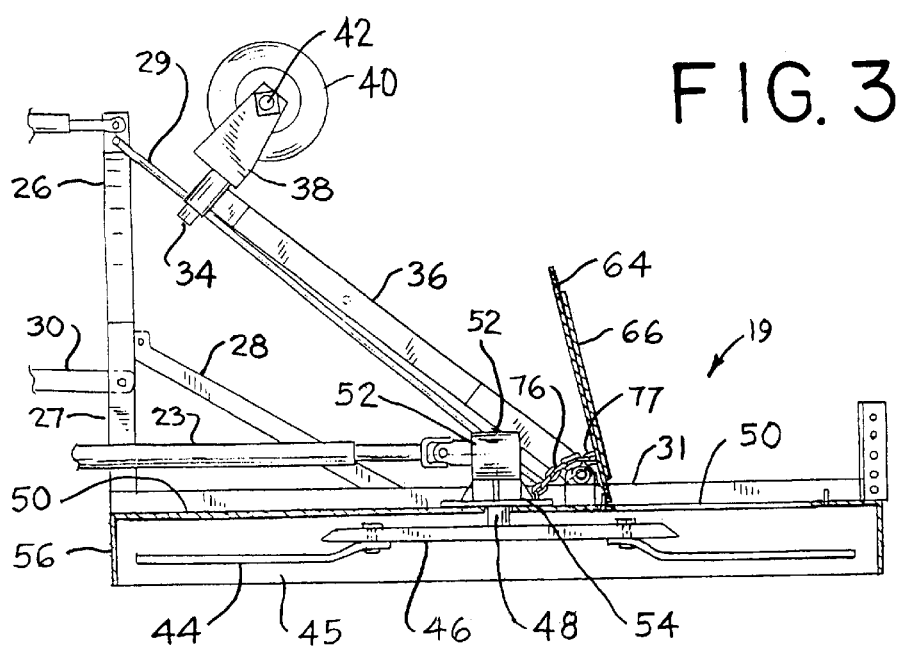
FIG. 3 is a side view of the rotary cutter assembly with the access door opened and showing parts broken away from clarity and ease of understanding.
Figure 4:
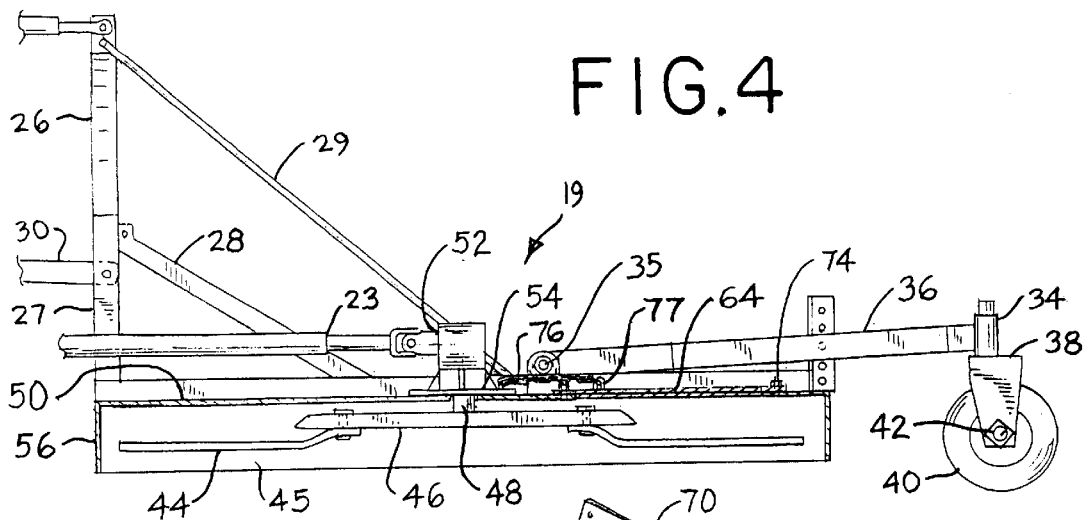
FIG. 4 is a side view of the rotary cutter assembly with the door closed.

A rotary cutter-wheel assembly 34 (FIGS. 1, 3 and 4) can be pivotally connected via one or more pivot pins 35 to the rotary-cutter frame. The rotary cutter-wheel assembly can comprise rearwardly extending bars 36 and 37 which provides wheel-support arms, from which a caster 38 providing a wheel support assembly or hub, can be cantilevered and extend downwardly. The rotary cutter-wheel assembly can also have a rotary-cutter idler wheel 40 comprising a tire which can provide a rear swivel wheel. The wheel can be connected by an axle 42 or pins to the wheel-support assembly. The rotary cutter-wheel assembly and idler wheel are normally kept and disposed in a lower downward position as shown in FIG. 4 to facilitate wheeled transport, movement, and pulling of the rotary cutter assembly by the tractor. The rotary cutter-idler wheel (rear swivel wheel) can also help elevate the housing and rotary-cutter frame and one or more rotary cutter blades 44 (FIGS. 3 and 4) (rotor blades) off the ground. The rotary cutter-wheel assembly can be pivoted and raised to an upward position above the ground as shown in FIG. 3, prior to sharpening the rotary cutter blade.

The housing and rotary cutter-frame can have an open bottom 45 so that the rotary cutter blade can cut and mow grass, weeds, fields of clover, shrubs, bushes, and other plants, as well as bark, twigs, branches and plant debris on farmland. The rotary cutter blade can span 4 feet, 5 feet, 6 feet, 8 feet, 10 feet or more or less. The rotary cutter blade can be bolted, riveted, or otherwise secured to a flywheel pan assembly 46 (FIGS. 3 and 4). The flywheel pan assembly can be rotated by and connected to an output shaft 48 which can provide an upright rotary blade-shaft. The output shaft (rotary blade-shaft) can extend upwardly through the top 50 of the housing and rotary cutter-frame to a rotary cutter-coupling 52. A pedestal 54 can be bolted or otherwise secured to the housing and rotary cutter-frame to elevate the rotary cutter-coupling above the housing and frame. The rotary cutter-coupling can connect the drive shaft of the tractor to the output shaft (rotary cutter-shaft) so that the tractor's drive shaft can drive and rotate the rotary cutter's output shaft in order to rotate and spin the rotary cutter blade.

Figure 2:
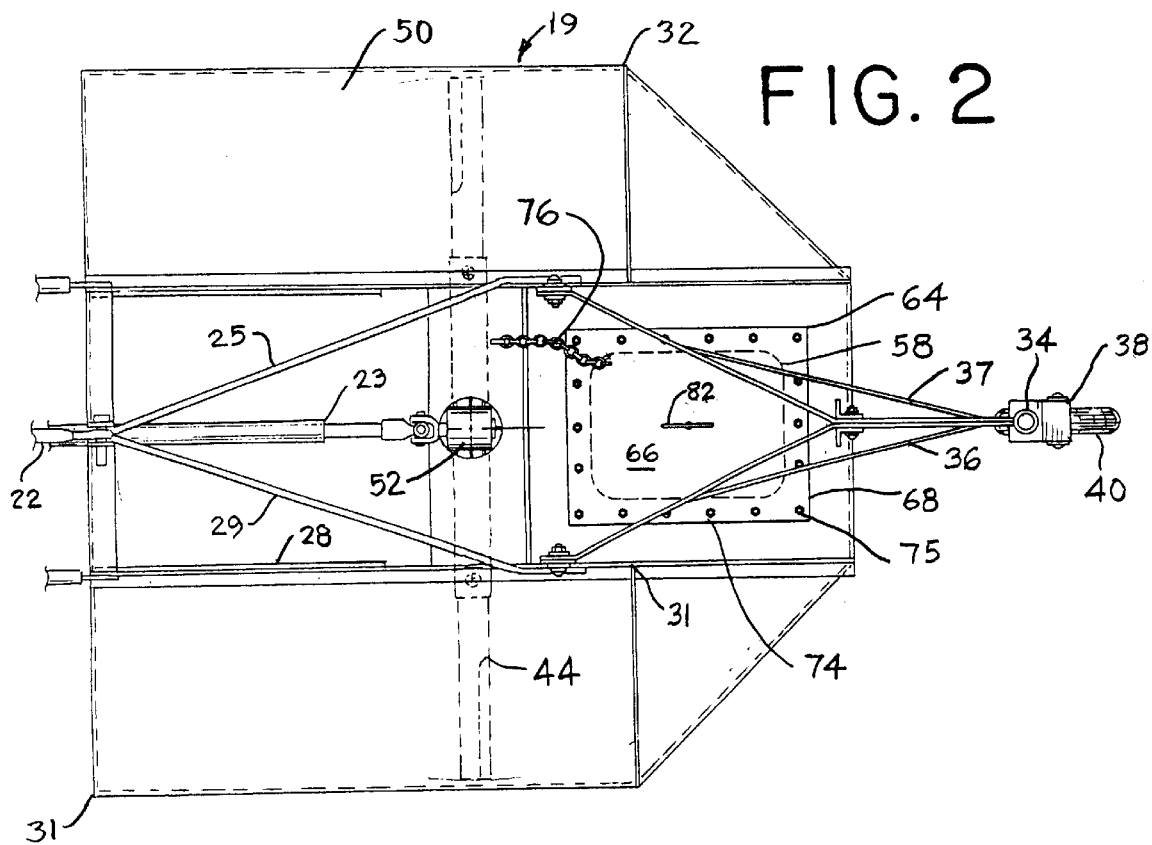
FIG. 2 is a top view of the rotary cutter assembly.

The housing and rotary cutter-frame can provide a frame assembly which covers the rotary cutter blade. The housing and rotary cutter-frame can help prevent and protect the driver (operator) of the tractor and bystanders from being struck by cuttings (cut grass, cut plants, etc.) and flying debris during cutting, rotation and operation of the rotary cutter blade. The housing and rotary cutter-frame can further protect the rotary cutter blade from rain and the environment. The rotary cutter-frame can also support the coupling, hitch assembly, and wheel assembly. The top of the housing and rotary cutter-frame can provide an upper portion, deck, and protective cover which can be positioned above the rotary cutter blade. A peripheral annular skirt 56 (FIG. 2) can extend and depend downwardly from the top (cover) of the housing and rotary cutter-frame and can peripherally and annularly surround the rotary cutter blade. The skirt can provide a lateral shield which can help block and prevent grass, cuttings and flying debris from being spun and thrown laterally from the rotary cutter assembly during cutting, rotation and operation of the rotary cutter blade.

Figure 5:
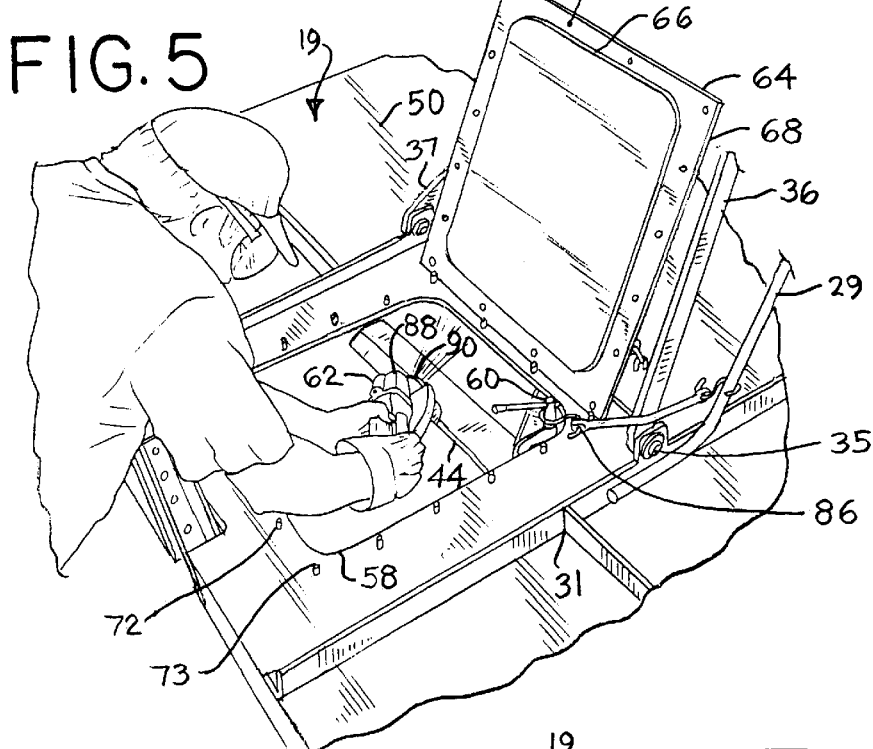
FIG. 5 is a perspective top view showing the rotary blade being sharpened after the blade has been secured by a clamp and safety strap.

The top of the rotary cutter-frame can have a hole comprising a rotary cutter blade-access opening 58 (FIG. 5) to permit a person, such as the tractor driver, maintenance person, farmer, etc. to grasp, sharpen, and maintain the rotary cutter blade. Preferably, the access opening is of a size to allow the person to insert one or more hands, as well as a clamp 60 (FIG. 5) and a sharpening tool 62, such as a power grinder (grinding wheel) to sharpen the rotary cutter blade. The illustrated access opening is rectangular, although in some circumstances it may be desirable that the access opening be circular or another shape.

Figure 6:
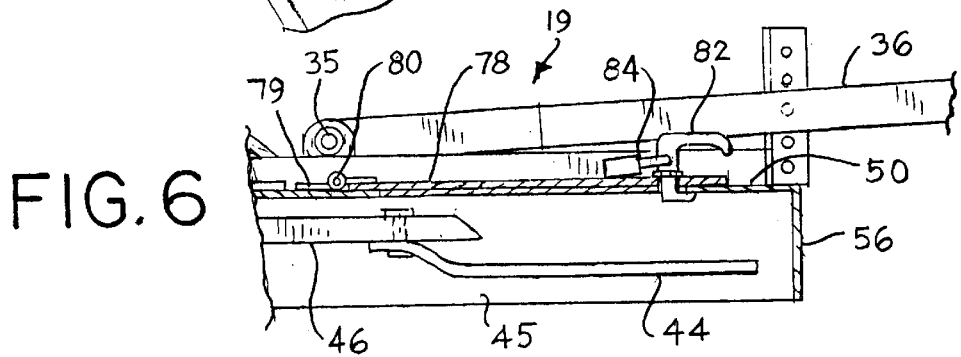
FIG. 6 is a perspective view of a hinged door and lock.

A rotary cutter-door 64 (FIGS. 2–5) which can comprise a solid metal hatch, lid, closure, and barrier can be provided to cover, block, and close the rotary cutter blade-access opening when the rotary cutter assembly is operating and the cutter blade is rotating. The door can have an imperforate fluid impermeable, liquid impervious, central portion 66 (FIG. 5) which can cover the access opening, and can have a periphery 68 or peripheral flange which can peripherally surround the central portion. The periphery of the door can have door-holes 70 (FIG. 5) which provide bolt holes that can be aligned with frame-holes 72 (bolt holes) in the frame about the access opening to receive threaded studs or bolts 73, nuts 74, and washers 75 (FIG. 2) or other fasteners to bolt, lock, fasten, secure and tighten the door (hatch) in a closed position during operation of the rotary cutter assembly. If threaded studs are used, they can be welded to and extend upwardly from the top of the housing and frame. A safety chain 76 (FIGS. 1–4) can also be provided as a supplementary fastener to fasten and secure the door. The safety chain can be connected to the pedestal and an eyelet 77 (FIG. 4) extending outwardly from the door. The door can be slightly larger and of a similar shape as the access opening. The door can comprise a removable access door. In some circumstances it may be desirable to use a pivotable hinged door 78 (FIG. 6) with hinges 79 and pivot pins 80 or a slidable door secured by a lock, bar (rod) or other fastener(s).

The door can be provided with a manually grippable (graspable) portion that provides a handle 82 (FIG. 6) to grip the door. The handle can be U-shaped, although in some circumstances it may be desirable that the handle be in the form of a door knob or some other shape. The handle facilitates positioning the door in a closed position to cover the access opening during operation of the rotary cutter assembly when the cutter blade is rotating and spinning. The handle also facilitates grasping and opening the door to remove the door from the access opening, after the bolts or other fasteners have been unfastened and removed, in order to gain access to and sharpen the rotary cutter blade. The handle and door can also be secured and locked by an internal or external lock 84 such as a key actuated lock or combination lock.

When it is desired to sharpen the rotary cutter blade, the rotary cutter assembly and rotary cutter blade are deactivated and stopped. The drive shaft of the tractor can be disconnected and uncoupled from the rotary cutter-coupling and the output shaft (rotary blade-shaft) of the rotary cutter assembly. The tractor hitch can be unhitched, disconnected and uncoupled from the rotary cutter-hitch assembly. The rotary cutter wheel assembly and idler wheel can be pivoted and raised to an upward position as shown in FIG. 3. The door can be unfastened and unlocked, by unfastening the safety chain and unfastening and removing the bolts, such as with a ratchet wrench, and/or by unlocking the lock. The door can then be opened, preferably by grasping the handle, to uncover and unblock the rotary blade-access opening to permit access to the rotary cutter blade. Preferably, the rotary cutter blade is secured in a stationary stopped position with a C-clamp 60 (FIG. 5) and an auxiliary safety strap 86 or safety cable to prevent movement of the cutter blade during sharpening of the blade. A sharpening tool 62, such as a hand held power grinder 88 with a grinding wheel 90, can be inserted and passed through the access opening to contact, grind and sharpen the rotary cutter blade.

After the rotary cutter blade is sharpened, the preceding procedure can be reversed as follows in order to use the rotary cutter assembly. Withdraw and remove the sharpening tool (e.g. grinding tool) from the rotary cutter blade and access opening. Unfasten and remove the safety strap and clamp. Close the door. Bolt, chain or otherwise fasten and lock the door. Lower the idler wheel to its normal downward position. Hitch the tractor hitch to the rotary cutter-hitch assembly. Couple the tractor drive shaft to the output shaft (rotary blade-shaft). Pull the rotary cutter assembly with the tractor. Rotate the rotary cutter blade via the tractor drive shaft to cut grass, weeds, shrubs, bushes, leaves, bark, twigs, branches and other plants and items desired to be cut.

Advantageously, the method of sharpening and maintaining the rotary cutter blade and rotary cutter assembly can be easily accomplished by one person without turning the rotary cutter assembly upside down, and without the need for 2–3 maintenance personnel as was previously done prior to this invention.

Among the many advantages of the novel rotary cutter assembly and sharpening method are:

1. Outstanding performance.
2. Superb cutting.
3. Excellent maintenance.
4. Enhanced safety.
5. Simple to use and implement.
6. Better fuel economy.
7. Longer blade life.
8. Less wear.
9. Fewer people required for maintenance.
10. Lower downtime.
11. Reduced turnaround time.
12. Decreased labor costs.
13. User friendly.
14. Convenient.
15. Economical.
16. Efficient.
17. Effective.

Although embodiments of the invention have been shown and described, it is to be understood that various modifications, alterations, and substitutions, as well as rearrangements of parts and process steps, can be made by those skilled in the art without departing from the novel spirit and scope of this invention.

What is claimed is:

1. A method for sharpening a rotary cutter assembly, comprising the steps of:

opening a door from a housing comprising a frame of the rotary cutter assembly;

accessing a rotary blade of the rotary cutter assembly without turning the rotary cutter assembly upside down;

securing the rotary blade to substantially minimize movement of the rotary blade;

sharpening the rotary blade;

releasing the rotary blade after said sharpening to accommodate subsequent rotation of the blade;

closing the door;

securing the door to the frame of the rotary cutter assembly;

said blade is sharpened with a grinder;

said grinder is passed through an access opening in an upper portion of said frame; and said door closes said access opening when said door is secured to said frame of said rotary cutter assembly.

2. A method for sharpening a rotary cutter assembly in accordance with claim 1 wherein:

said door is secured to the frame of the rotary cutter assembly by at least one faster; and said door is opened after unfastening the fastener.

3. A method for sharpening a rotary cutter assembly in accordance with claim wherein said door is bolted, chained or locked to the frame of the rotary cutter assembly to secure said door to said frame.

4. A method for sharpening a rotary cutter assembly, comprising the steps of:

opening a door from a housing comprising a frame of the rotary cutter assembly;

accessing a rotary blade of the rotary cutter assembly without turning the rotary cutter assembly upside down;

securing the rotary blade to substantially minimize movement of the rotary blade;

sharpening the rotary blade;

releasing the rotary blade after said sharpening to accommodate subsequent rotation of the blade;

closing the door;

securing the door to the frame of the rotary cutter assembly; and raising a wheel assembly connected to said frame prior to opening said door.

5. A method for sharpening a rotary cutter assembly, comprising the steps of:

opening a door from a housing comprising a frame of the rotary cutter assembly;

accessing a rotary blade of the rotary cutter assembly without turning the rotary cutter assembly upside down;

securing the rotary blade to substantially minimize movement of the rotary blade;

sharpening the rotary blade;

releasing the rotary blade after said sharpening to accommodate subsequent rotation of the blade;

closing the door;

securing the door to the frame of the rotary cutter assembly; and wherein opening said door includes detaching and removing said door.

6. A method for sharpening a rotary cutter assembly, comprising the steps of:

opening a door from a housing comprising a frame of the rotary cutter assembly;

accessing a rotary blade of the rotary cutter assembly without turning the rotary cutter assembly upside down;

securing the rotary blade to substantially minimize movement of the rotary blade;

sharpening the rotary blade;

releasing the rotary blade after said sharpening to accommodate subsequent rotation of the blade;

closing the door;

securing the door to the frame of the rotary cutter assembly;

disconnecting a rotary blade-shaft of the rotary cutter assembly from a drive shaft of a tractor or machine prior to opening said door; and unhitching a frame of the rotary cutter assembly from the tractor or machine prior to opening said door.

7. A method for sharpening a rotary cutter assembly in accordance with claim 6 including:

clamping said blade with a clamp to secure said blade prior to sharpening said blade; and unclamping and removing said clamp to release said blade after said blade has been sharpened.

8. A method for sharpening a rotary cutter assembly in accordance with claim 7 including securing a safety strap or cable to said clamp prior to sharpening said blade of said rotary cutter assembly.

* * * * *